Jan. 10, 1928.
W. E. HULL
1,656,116
ELECTRICAL MEASURING INSTRUMENT
Filed April 14, 1926
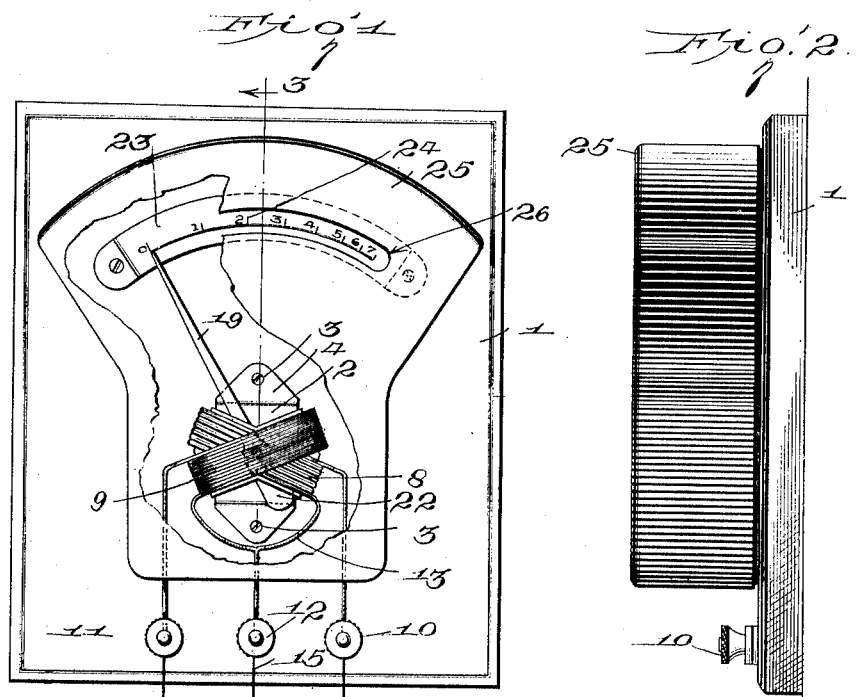
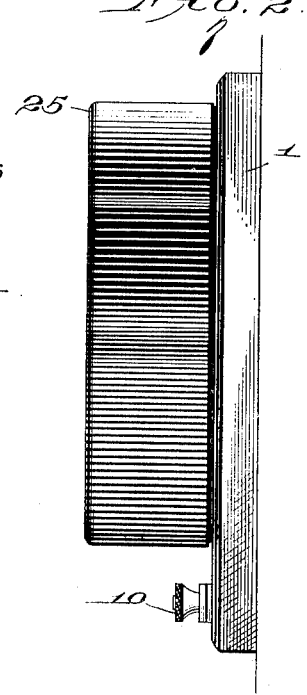
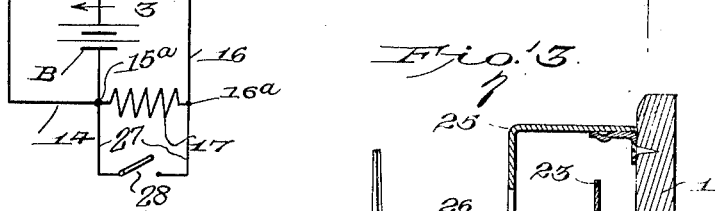
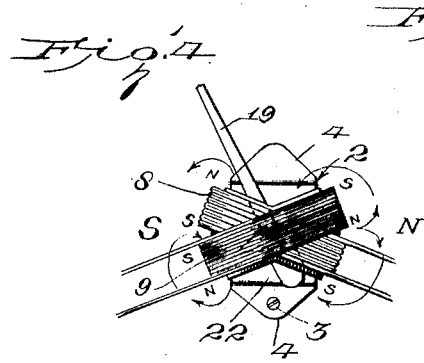
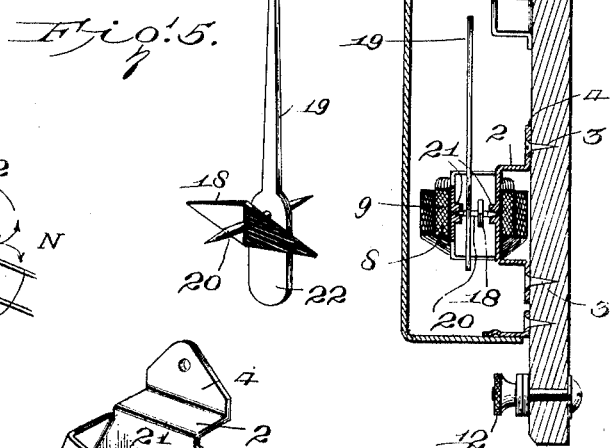
WITNESSES
INVENTOR
Walter E. Hull
BY
ATTORNEYS Patented Jan. 10, 1928.

1,656,116

UNITED STATES PATENT OFFICE.

WALTER E. HULL, OF SHARPSVILLE, PENNSYLVANIA.

ELECTRICAL MEASURING INSTRUMENT.

Application filed April 14, 1926. Serial No. 101,993.

This invention relates to improvements in electrical measuring instruments, an object being to provide a simple instrument for quickly determining or measuring the ohmic resistance of any given conducting element without requiring any setting of rheostats by hand or any of the performances usually required in ascertaining an unknown resistance.

Other objects and advantages will appear in the following specification, reference being had to the accompanying drawing, in which Figure 1 is a front elevation of the improved electrical measuring instrument, a portion of the casing being broken away to reveal the internal arrangement.

Figure 2 is a side elevation of the instrument.

Figure 3 is a central section taken on the line 3—3 of Figure 1.

Figure 4 is an elevation of the coils, pointer and frame hereinafter referred to.

Figure 5 is a detail perspective view of the pointer.

Figure 6 is a detail perspective view of the frame.

As briefly indicated in the foregoing statements of the object of the invention, the instrument is designed for measuring an unknown electrical resistance with the same facility that the current of an electrical circuit can be measured with the familiar ammeter or the electrical pressure can be measured with a volt meter. The instrument is so arranged that it may quickly be applied and the quantity of the unknown resistance read in ohms.

In carrying out the invention provision is made of a wood or other suitable base 1 upon which the frame 2 is mounted by means of screws 3 or other suitable fastening devices. These pass through holes in the flanges 4 with which the frame is provided. The frame is formed to produce a tubular portion 5 (Fig. 6), the ends of which come to points or are oppositely beveled as at 7. Diametrically oppositely beveled sides are parallel to each other so that coils of wire may be wound upon the tubular portion in crossed arrangement.

The tubular frame portion or form 5 is preferably taped (ordinary friction tape being used) prior to winding the coils 8 and 9 in order to furnish desirable insulation. The coil 8 is composed of wire of slightly greater diameter than that of the coil 9 thereby, because its resistance to current is less, producing a stronger magnetic field around the coil 8 when the coils are energized and when the unknown resistance is zero as explained later.

Binding posts 10 and 11 provide connections for the remote ends of the coils 8 and 9, while a single central binding post 12 provides the connection for the near ends of the coils which are joined as at 13. Current is derived from a source of energy, for example the battery B. The positive pole of the battery is connected with the binding post 11 by means of a wire 14. The negative pole of the battery is connected with the binding post 12 by means of a wire 15. The remaining binding post 10 is connected with the positive pole of the battery by means of a wire 16, but the unknown resistance 17 which is to be measured is interposed in this wire as diagrammatically illustrated in Figure 1, binding posts $15^a$ and $16^a$ being provided for this purpose at the junction of wires 14 and 15, and at the terminal of wire 16, respectively. From the opposite side of these binding posts, a shunt wire 27 bridges the resistance and includes a suitable switch 28 to connect the circuit when the unknown resistance is not in circuit.

A compass needle 18 and pointer 19 constitute the armature of the instrument. These elements are assembled at right angles upon the axle 20, the ends of which are finely pointed to revolve as freely as possible in bearings 21 on the interior of the tubular form 5 of the frame. The pointer is counterbalanced as at 22 so that it may not be affected by gravity, should the instrument not be sitting in a level position. The pointer is movable over a dial 23 which is graduated in ohms as indicated at 24. The dial is secured upon the base. The entire instrument is protected by a cover 25 which has an arcuate slot 26 through which the end of the pointer and the graduation can be observed.

The operation is readily understood. The coils 8 and 9 which may be said to constitute a cruciform coil having separate crossed windings of relatively different resistance capacity are so wound upon the tubular form 5 that a passage of current through the coil 8 will produce north and south poles as indicated by the small abbreviations N and S in Figure 4. The coil 9 is so wound that a passage of current therethrough will produce North and South poles as again abbreviated N and S in Fig. 4. The resultant of the two magnetic fields would be in a line directly across the coils, as indicated by the large abbreviations N and S if the size of wire in both coils was the same and the current in both coils was the same. However, the coil 8 is of wire of slightly greater diameter, as has been stated, and an equal E. M. F. impressed across both coils (the resistance in the branch 16 being regarded as zero) will produce a slight rotation of the resultant magnetic field of the coils to the left so that the pointer 19 assumes an initial zero position in reference to the dial 23. The magnetic needle 18 lies in the direction of the lines of force and will follow the resultant of the magnetic fields at the coils.

Assume that an unknown resistance 17 is to be measured. The resistance is interposed in the branch 16 between the positive pole of the battery B and the binding post 10 of the relatively heavy wire coil 8. The interposition of the resistance reduces the current delivered to the coil 8 and in turn weakens the magnetic field thereof so that the resultant of the magnetic forces of the two coils rotate to the right. The magnetic needle 18 follows, and the pointer 19 traverses the dial 23 to the right. The amount of movement of the needle and of the pointer 19 to the right increases as the resistance 17 increases.

Ordinarily a simple dry cell is employed as the electrical current source B. The current in the positive branch 14 is substantially constant, but is variable in the branch 16 due to the interposition of the resistance to be measured. If the resistance 17 is eliminated so that the current in both branches 14 and 16 is balanced, the needle 19 will be caused to take the initial zero position over the dial 23 in the manner previously stated. But an increase in resistance by reason of insertion of resistance 17 will result in a decrease of the electro-magnetic field of the coil 8 and a rotation of the resultant field to the right with a consequent movement of the pointer 19 to the right. The position of the pointer 19 will not be affected by the strength of the dry cell, assuming the dry cell to become weaker with use, as the proportion of the currents flowing through the two coils remains the same regardless of the strength of the cell.

Instruments of the foregoing character may be designed to measure very high or very low resistances, the only difference being in the requirement of different coils to suit the various purposes. A few turns of wire of relatively large diameter are used for measuring low resistances, and many turns of wire of much less diameter are used for measuring high resistances. It is also understood that measuring resistance may extend to indicate conditions of which resistance or variations in resistance serve as indication or measure.

While the construction and arrangement of the improved electrical measuring instrument is that of a generally preferred form, obviously modifications and changes may be made without departing from the spirit of the invention or the scope of the claims.

I claim:—

1. An electrical measuring instrument comprising a cruciform coil having separate crossed windings of relatively different resistance magnitudes and a source of constant E. M. F. for both coils, an indicator and a magnetic needle armature occupying and pivotally mounted in the electro-magnetic field of the coils, said armature causing the needle to swing to a "zero" indicating position, determined by the resultant of the magnetic fields of the unbalanced coils when subject to the constant E. M. F. aforesaid, and being swung to an ohm-indicating position by the shifting of said resultant through interposition in the said unbalanced coil circuits of an unknown resistance whose magnitude is determined by the proportionate movement of the indicator armature responsive to the shifting of said resultant.

2. An electric measuring instrument comprising a pair of coils in crossed relationship and of relatively different resistance magnitudes, a source of constant E. M. F. having connections with one end of each of the coils and with the joined other ends of the coils, an indicator and a magnetic needle armature occupying and pivotally mounted in the electro-magnetic field of said coils, the movement of the magnetic needle to zero indicating position being coincident with and dependent upon the normal unbalanced condition of the electro-magnetic field through a constant E. M. F. impressed across both coils, provision being made for interposing an unknown resistance between the current source and that coil of less resistance magnitude to vary the resistance and thereby shift the resultant of the magnetic fields of the coils and the indicator armature in proportion to the amount of the unknown resistance interposed in the circuit.

3. In an electric measuring instrument a tubular coil mounting having top, bottom and sides closed and integral and having its ends open and provided with offset supporting brackets at the bottom thereof, the opposite sides of the mounting being each oppositely beveled outwardly to substantially a point with diametrically opposed bevels at opposite sides in parallel, a pair of coils wound crosswise over the opposite parallel bevels providing a cruciform coil with separate crossed windings, alined trunnion bearings on and projecting inwardly from the inner faces of said tubular mounting approximately at right angles to the axis of the electro-magnetic fields of said coils, and an armature consisting of a magnetic needle trunnioned in said bearings.

4. An electric measuring instrument comprising a cruciform coil having separate crossed windings of relatively different resistance magnitudes and a source of constant E. M. F. with connections providing for separate circuits of constant E. M. F. for each coil, an indicator and a magnetic needle armature occupying and pivotally mounted in the electro-magnetic field of the coils, said armature causing the needle to be swung to a "zero" indicating position determined by the resultant of the electro-magnetic field of the unbalanced coils when subjected to the constant E. M. F. aforesaid, and being swung to an ohm-indicating position by the shifting of said resultant through the interposition in the circuit of the coil of less resistance magnitude of an unknown resistance whose magnitude is determined by the proportionate movement of the indicator armature responsive to such shifting of the resultant.

WALTER E. HULL.